United States Patent Office 2,981,716
Patented Apr. 25, 1961

2,981,716

ALPHA-OLEFIN POLYMERS STABILIZED WITH PHENYL PHOSPHINE DERIVATIVES

Brian F. Street, Upton-by-Chester, and Wladyslaw H. Skoroszewski, Davyhulme, near Manchester, England, assignors to Shell Oil Company, a corporation of Delaware No Drawing. Filed June 18, 1959, Ser. No. 821,081

Claims priority, application Great Britain July 1, 1958

6 Claims. (Cl. 260—45.7)

This invention relates to stabilized polymers of mono-alpha-olefins. More particularly it relates to stabilized compositions and methods for stabilizing polymers of alpha-olefins prepared at low temperatures and pressures.

It is now well known that polymers of mono-alpha-olefins may be prepared at low temperatures and pressures in the presence of certain catalyst compositions which are commonly referred to as "Ziegler catalysts" or "low-pressure catalyst." These catalysts may be briefly described as comprising the reaction product of at least one compound of a metal of group IV–VI of the periodic table with at least one of the following: (A) aluminum trialkyl, (B) a compound of the formula $R_1R_2AlX$ wherein $R_1$ and $R_2$ are selected from the group consisting of hydrogen and hydrocarbons and X is selected from the group consisting of hydrogen, halogen alkoxy, aryloxy, the residue of a secondary amine, secondary acid amine, mercaptan, diphenol, carboxylic acid and sulfonic acid, (C) an organo zinc compound, and (D) an organo-magnesium compound. The composition prepared from a compound of the formula $R_1R_2AlX$ in which $R_1$ and $R_2$ are selected from the group consisting of hydrogen and hydrocarbon and X is a halogen with a metal selected from the group consisting of metal from the group VIII of the periodic table or manganese may also be used. Low pressure polymers of alpha-olefins may also be obtained with a catalyst composition comprising the reaction product aluminum trichloride, titanium tetrachloride and aluminum powder. Still other catalyst compositions are known for the production of polymers of alpha-olefins at low temperatures and pressures but the nature of the catalyst composition is not the important feature of the stabilized compositions of this invention, as long as the polymers are linear or crystalline.

It is an object of this invention to provide novel compositions of polymers of mono-alpha-olefins. It is another object of this invention to provide stabilized compositions of polymer of alpha-olefins. It is a further object of this invention to provide polymers of alpha-olefins which have color stability and which have improved resistance to oxidation. It is yet another object of this invention to provide methods for stabilizing linear or crystalline polyethylene and polypropylene. It is still another object of the present invention to prevent, or at least appreciably reduce, tendency of the polyolefins to degrade during processing (e.g. milling or molding) operation which as are carried out during the manufacture of articles therefrom and also during the subsequent lifetime of such articles.

While this invention applies equally to polymers of mono-alpha-olefins for the sake of convenience, the description of the invention is directed mainly to polyethylene.

The linear polyethylene, prepared by the low-pressure processes tend to degrade and discolor on exposure to light and on being subjected to elevated temperatures, i.e. temperatures above 100° C. A number of compounds have been proposed as additives to impart resistance to degradation under the conditions indicated. In the case of polyethylene, polypropylene and other low-pressure polymers of mono-alpha-olefins, an appreciable number of these known additives have been found to be useful to reduce degradation but many of them have a concomitant adverse affect, that is of causing a marked color formation or "staining." Thus when such additives are added to the linear polyethylene, there is often produced discoloration which may develop immediately during the admixing of the additives or subsequently during milling or molding at elevated temperatures. It is at present considered that this may be due, in part, to traces of catalyst residues in the polymer, such as traces of aluminum or titanium compounds, which in themselves are not deleterious to the normal properties of the polyolefins but which are sufficient to cause staining with conventional antioxidants to an objectionable extent.

Thus it has been found that most of the antioxidants which are quite satisfactory for use with polyethylene produced by the high pressure processes produce this pronounced discoloration when used in polymeric materials based on the low-pressure polyethylene, and are thus of no commercial usability as antioxidants for low-pressure polyolefins.

According to the present invention, a normally solid polymer of a mono-alpha olefin is stabilized by the addition of from about 0.01 to about 5% by weight of the polymer, of an organic phosphine having the formula $P(R)(R')(R'')$ wherein R is a hydrocarbon radical containing an aromatic nucleus and $R'$ and $R''$ are the same or different hydrocarbon radicals. In the most preferred embodiment the R's are aromatic and more preferably they are the same aromatic radicals such as phenyl, naphthyl, anthracyl, the corresponding alkyl substituted radicals, and the like. The more preferred phosphines are represented by triphenyl phosphine, diphenyl decyl phosphine, diphenyl tolyl phosphine, tritolyl phosphine, diphenyl benzyl phosphine and naphthyl diphenyl phosphine. Although the phosphine that is employed in the present invention ranges from as little as 0.01 to about 5% by weight of the polymer, amounts in the order of 0.05 to to about 0.5% by weight is usually adequate.

The organic phosphines may be incorporated into the polymer of the olefin by any suitable means such as by milling on heated rolls, extruding, Banburying, and the like. In some cases it may be advantageous to add a small amount of base, such as an alkali metal carbonate or an alkaline earth metal oxide, so as to provide some residual alkalinity in the polymeric material. Thus it has been found that in the presence of up to about 0.75% by weight, of polyethylene, of an alkali metal hydroxide or carbonate or an alkaline earth metal oxide, hydroxide or carbonate is particularly useful for molding materials prepared from polyethylene or polypropylene which, according to this invention contain residues of the low pressure catalyst. It will be readily appreciated that a plurality of phosphines of the type described above may be present in the composition which is subjected to the milling, extruding, etc. and may also include various other modifiers, as rubber, pigments, fillers, lubricants, antistatic agents, and the like.

The invention will be described in greater detail in the examples which follow.

EXAMPLE I

Polyethylene was formed into sheets by milling the polyethylene for 1 hour on a 2-roll mill with a mill surface temperature of approximately 160° C. Table I gives summaries of some comparative results obtained by incorporating various amounts of triphenyl phosphine and a more conventional antioxidant in the polyethylene. The figures for color rating are obtained in a standard reflectivity test and are based on a rating of 100 for a standard white disc. The polyethylene used as the base material had a color rating of 85 on this scale. The intrinsic viscosity (I.V.) (determined as 0.1% solution in decalin at 120° C.) and the melt index (M.I.) of the polyethylene prior to processing was 2.25: the I.V. and M.I. of the material after hot rolling provides an indication of the degree of degradation (if any) which has taken place. The polyethylene was prepared as indicated in Belgian Patent 533,362 using aluminum triethyl-titanium tetrachloride reaction product as the catalyst.

*Table I*

| Antioxidant | Percent, by weight, of antioxidant | Before milling | | | After milling | | |
|---|---|---|---|---|---|---|---|
| | | I.V. | Color | M.I. | I.V. | Color | M.I. |
| None | | 2.25 | 85 | 0.34 | 1.83 | 77 | 0.14 |
| Triphenyl phosphine | 0.1 | 2.35 | 80 | 0.37 | 2.35 | 75 | 0.39 |
| Do | 0.3 | 2.02 | 79 | 0.42 | 2.07 | 81 | 0.41 |
| 4,4' butylidene bis(3-methyl-6-tert butyl phenol) | 0.1 | 2.18 | [1] 46 | 0.4 | 2.13 | 49 | 0.47 |

[1] Discoloration occurred on mixing in the conventional antioxidant before hot milling.

EXAMPLE II

Oven aging tests were carried out on low-pressure polyethylene containing 0.1% of either triphenyl phosphine or "Nonox" CI[1] as antioxidant. In these tests, specimens of polymeric material comprising polyethylene and the respective additive were kept in an oven at 120° C. for periods of 24 and 48 hours and the percentage weight change and also the power factor of the polymer after these periods were determined. The results are indicated in the following table, together with figures for the polyethylene without any additive:

*Table II*

| Additive | Percent change in weight | | Power factor×10⁵ | | |
|---|---|---|---|---|---|
| | After 24 hrs. | After 48 hrs. | At the start | After 24 hours | After 48 hours |
| None | +0.07 | +0.423 | 7 | 40 | 145 |
| 0.1% triphenyl phosphine | +0.011 | −0.001 | 11 | 13 | 12 |
| 0.1% "Nonox" CI[1] | −0.138 | −0.184 | 10 | 7 | 9 |

[1] Sym-di-beta-naphthyl-p-phenylene diamine.

EXAMPLE III

Molding trials were carried out using polyethylene containing triphenyl phosphine. The triphenyl phosphine was added to the polyethylene in an amount equal to 0.2 part per hundred of polyethylene and the resulting mixture extruded in a Buss Ko-Kneader and the product finally chopped in a cutter to give a molding powder: the resulting material had an I.V. of 1.77, a M.I. of 2.08 and a color rating of 86. Discs were then molded in an injection molder using various molding (i.e. injection) temperatures. The properties of the material after molding were then determined and the results are given in Table III.

*Table III*

| | Injection temperature | | |
|---|---|---|---|
| | 200° C. | 240° C. | 270° C. |
| Color | 84 | 82 | 78 |
| I.V. | 2.37 | 2.46 | 2.62 |
| M.I. | 1.61 | 1.63 | 1.52 |

EXAMPLE IV

Using the same formulation as in Example III, except that the triphenyl phosphine is replaced with the same amount, by weight, of tri-p-tolylphosphine, the resulting polymer has substantially the same color, I.V. and M.I.

EXAMPLE V

Polypropylene is prepared by known polymerization processes using titanium trichloride-aluminum diethylchloride reaction product as the catalyst. The solid polymer is then milled with 0.2% by weight of diphenyl decyl phosphine. The milled product is then granulated and compression molded. In comparison to polypropylene that contains no phosphine, the specimen with the phosphine has substantially better color and flow properties. Further the I.V. is not reduced severely.

We claim as our invention:

1. A composition comprising a polymer of an alpha-olefin containing titanium metallic residues and from 0.01 to about 5%, by weight, of a phosphine of the formula P(R)(R')(R'') wherein R is a hydrocarbon radical containing an aromatic nucleus and R' and R'' are hydrocarbon radicals.

2. The composition of claim 1 in which the polymer is polyethylene.

3. The composition of claim 1 in which the polymer is polypropylene.

4. The composition of claim 1 in which the phosphine is triphenyl phosphine.

5. The composition of claim 1 in which the phosphine is tritolyl phosphine.

6. The composition of claim 1 in which the phosphine is diphenyl decyl phosphine.

References Cited in the file of this patent

UNITED STATES PATENTS 2,860,115    Hecker et al. _____ Nov. 11, 1958